United States Patent
Xu et al.

(10) Patent No.: US 9,623,459 B2
(45) Date of Patent: Apr. 18, 2017

(54) PERFORMANCE FEED-FORWARD THICKNESS CONTROL METHOD IN TANDEM COLD MILL

(71) Applicant: BAOSHAN IRON & STEEL CO., LTD., Shanghai (CN)

(72) Inventors: Jianghua Xu, Shanghai (CN); Shanqing Li, Shanghai (CN); Peijie Huang, Shanghai (CN); Zhenglian Jiang, Shanghai (CN); Kangjian Wang, Shanghai (CN); Xin Wang, Shanghai (CN); Hongmei Li, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 227 days.

(21) Appl. No.: 14/366,034

(22) PCT Filed: May 8, 2013

(86) PCT No.: PCT/CN2013/075316
§ 371 (c)(1),
(2) Date: Jun. 17, 2014

(87) PCT Pub. No.: WO2013/174213
PCT Pub. Date: Nov. 28, 2013

(65) Prior Publication Data
US 2015/0094843 A1 Apr. 2, 2015

(30) Foreign Application Priority Data
May 23, 2012 (CN) .......................... 2012 1 0161787

(51) Int. Cl.
*B21B 37/16* (2006.01)
*G05B 15/02* (2006.01)

(52) U.S. Cl.
CPC .............. *B21B 37/16* (2013.01); *G05B 15/02* (2013.01)

(58) Field of Classification Search
None
See application file for complete search history.

(56) References Cited

U.S. PATENT DOCUMENTS

| 3,892,112 A | * | 7/1975 | Smith, Jr. | ............... B21B 37/16 72/9.4 |
| 6,412,322 B1 | * | 7/2002 | Hyakutake | ............ B21B 37/005 72/11.5 |

(Continued)

FOREIGN PATENT DOCUMENTS

| CN | 1857829 A | 11/2006 |
| CN | 101147918 A | 3/2008 |

(Continued)

OTHER PUBLICATIONS

International Search Report under date of Aug. 15, 2013, in connection with PCT/CN2013/075316.

*Primary Examiner* — Ryan Jarrett
(74) *Attorney, Agent, or Firm* — Quarles & Brady LLP (57) ABSTRACT

The present invention relates to the field of strip cold rolling, and in particular to a thickness control method for strips in a tandem cold mill. Frame $S_1$ and one or more additional frames are selected as virtual indirect measuring instruments for the strip performance. A load cell is provided on the frames that are selected as the indirect measuring instruments for the strip performance, and deformation resistance fluctuation of the supplied materials of the frame S is calculated. Finally, the feed-forward adjustment amount of each frame is calculated. The present invention measures the deformation resistance of each section of the strip of the supplied materials through the selected frame, reducing the (Continued)

fluctuation of the thickness of the finished products of the strip and ensuring stable rolling.

4 Claims, 5 Drawing Sheets

(56) References Cited

U.S. PATENT DOCUMENTS

| | | | |
|---|---|---|---|
| 2007/0068210 A1* | 3/2007 | Pittner | B21B 37/165 |
| | | | 72/10.1 |
| 2011/0041580 A1* | 2/2011 | Ogawa | B21B 37/46 |
| | | | 72/31.07 |

FOREIGN PATENT DOCUMENTS

| | | | |
|---|---|---|---|
| CN | 101612633 A | | 12/2009 |
| CN | 102029292 A | | 4/2011 |
| JP | 2-211906 A | | 8/1990 |

* cited by examiner

PERFORMANCE FEED-FORWARD THICKNESS CONTROL METHOD IN TANDEM COLD MILL

CROSS-REFERENCE TO RELATED APPLICATIONS

This application represents the national stage entry of PCT International Application No. PCT/CN2013/075316 filed May 8, 2013, which claims priority of Chinese Patent Application No. 201210161787.0, filed May 23, 2012, the disclosures of which are incorporated by reference here in their entirety for all purposes.

FIELD OF THE INVENTION

The present invention relates to the field of strip cold rolling, and in particular to a thickness control method of strips in tandem cold mill.

BACKGROUND OF THE INVENTION

Thickness precision is one of the most important quality indexes for cold rolled strips. With the rise and development of industries like automobiles, aviation, household appliances, precision instruments, civil architecture, food cans, there are strict requirements on the thickness precision of cold rolled strips.

Tandem cold mill is one of the most complicated equipments with highest degree of automation and meeting the strictest requirements on precision in metallurgical industry, which, to some extents, represents the level of technological development in steel industry. Thickness feed-forward control in tandem cold mill plays an important roll in ensuring the thickness precision of cold rolled strip finished products. The thickness deviation of supplied materials is one of the significant causes for the thickness deviation of cold rolled strip finished products; therefore, the traditional thickness feed-forward control in a tandem cold mill is performed by the thickness deviations of supplied materials measured directly before frames.

The complexity of hot rolling process may thus result in performance fluctuation of the supplied materials, that is, the hot rolled products. The fluctuation thereof exhibits some degree of regularity. When a section of strip with said performance fluctuation enters each frame of the tandem cold mill, new thickness deviations may occur. Thus, it is of great significance for improving the thickness precision control to do research on the thickness feed-forward control method in the case of performance fluctuation of strips.

Figure 1:
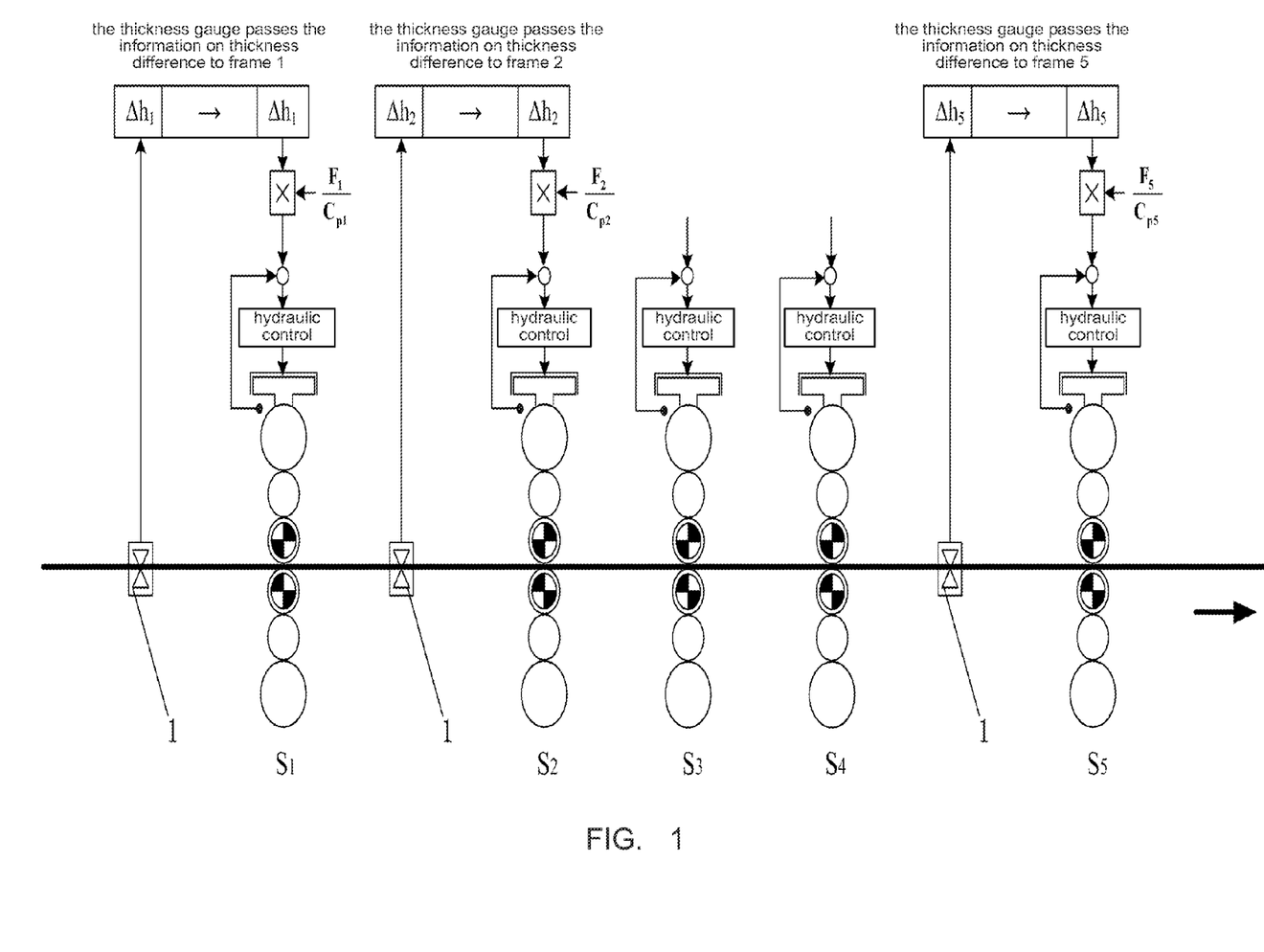
FIG. 1 is the block flow chart of the thickness feed-forward control method in a tandem cold mill in the prior art.

In the current thickness feed-forward control in a tandem cold mill, the thickness deviations of supplied materials measured directly before the frames $S_1$, $S_2$ and $S_5$ are used for the feed-forward control. The adjustment mechanisms used for feed-forward control are hydraulic control systems of the frames $S_1$, $S_2$ and $S_5$, respectively, and the principle thereof is shown as FIG. 1. Feed-forward control is mainly used for eliminating the instantaneous deviation, that is, when a large variation of the supplied material at the entry of a frame takes place, the hydraulic control systems of the frame takes actions correspondingly, so as to substantially eliminate the thickness deviations before exiting the frame.

Due to the higher requirements from users on the thickness precision of the cold rolled products as well as the complexity of hot rolling, it is necessary to take the effects of the performance fluctuation of the supplied material on the thickness deviations of finished products into consideration. The direct measurement on the performance of supplied materials before the tandem cold mill needs to add measuring instruments. However, the current measuring instruments have low precision. Additionally, this method needs to increase the equipment cost and corresponding maintenance personnel during manufacturing.

SUMMARY OF THE INVENTION

The objective of the present invention is to provide a performance feed-forward thickness control method in a tandem cold mill, which performs the thickness feed-forward control by the deformation resistance force of supplied materials measured indirectly. The method prevents the effects of performance fluctuation of supplied hot rolled products on the accuracy of thickness control during cold rolling, which is of positive significance to guarantee the precision of the thickness of finished products of the strip in the length direction of the entire steel coil, reducing the fluctuation of the thickness of the finished products of the strip and ensuring stable rolling.

The objective of present invention is achieved in such a way that a performance feed-forward thickness control method in a tandem cold mill comprises the following steps:

step 1, selecting one or more frames as virtual indirect measuring instrument(s) of strip performance, in which the frame $S_1$ must be a virtual indirect measuring instrument of strip performance, and a thickness gauge is provided at the entry of $S_1$;

step 2, calculating the value of the deformation resistance fluctuation of supplied materials: providing a load cell on the frames that are selected as the indirect measuring instruments for the strip performance, measuring the rolling force deviation $\Delta P_i$ caused by the deformation resistance fluctuation of the frame $S_i$ via the load cell, then calculating the value of deformation resistance fluctuation $\Delta k_i$ of supplied material of the frame $S_i$ according to the following formula 1:

$$\Delta k_i = \frac{\Delta P_i}{Q_i}, \qquad (1)$$

where $Q_i$ is the influence coefficient of the deformation resistance on the rolling force of the frame $S_i$, which is an empirical coefficient and obtained through experiments;

step 3, calculating the feed-forward adjustment amount for each frame: calculating the feed-forward adjustment amount $\Delta y_i$ for each frame $S_i$ according to the selection as follows, 1) if the frame $S_i$ is selected as the virtual indirect measuring instrument of strip performance, that is, the frame $S_i$ is provided with a load cell, calculating the feed-forward adjustment amount $\Delta y_i$ for the frame $S_i$ according to the formula 2:

$$\Delta y_i = \frac{\Delta h_i \times F_i}{C_{pi}}, \qquad (2)$$

where $\Delta h_i$ is the thickness deviation of the strip at the entry of the frame $S_i$ measured by the thickness gauge. If there is no thickness gauge provided at the entry of the frame $S_i$, the feed-forward adjustment amount for the frame $S_i$ will not be calculated;

$C_{pi}$ is the longitudinal rigidity of the frame $S_i$;

$F_i$ is the influence coefficient of the thickness of the strip at the entry of the frame $S_i$ on the rolling force of the frame $S_i$, which is an empirical coefficient and obtained through experiments;

2) if the frame $S_i$ is not selected as the virtual indirect measuring instrument of strip performance, that is, the frame $S_i$ is not provided with a load cell, then the value of deformation resistance fluctuation of this frame is that of the previous nearest frame, that is, $\Delta k_i = \Delta k_{i-1}$, then calculating the feed-forward adjustment amount $\Delta y_i$ for the frame $S_i$ according to the formula 3:

$$\Delta y_i = \frac{\Delta k_i \times Q_i + \Delta h_i \times F_i}{C_{pi}}, \quad (3)$$

where $\Delta h_i$ is the thickness deviation of the strip at the entry of the frame $S_i$ measured by the thickness gauge. If there is no thickness gauge provided at the entry of the frame $S_i$, then $\Delta h_i = 0$.

$C_{pi}$ is the longitudinal rigidity of the frame $S_i$;
$F_i$ is the influence coefficient of the thickness of the strip at the entry of the frame $S_i$ on the rolling force of the frame $S_i$, which is an empirical coefficient and obtained through experiments.

In the substep 2) of step 3, if the frame $S_i$ is not selected as the virtual indirect measuring instrument of strip performance, that is, the frame $S_i$ is not provided with a load cell but is provided with a thickness gauge (1) at the entry thereof, an influence coefficient $a_i$ of the deformation resistance on the thickness feed-forward parameter compensation may be added when calculating the feed-forward adjustment amount of the frames, then calculating the feed-forward adjustment amount $\Delta y_i$ for the frame $S_i$ according to the formulas 4:

$$\Delta y_i = \frac{b_i \times \Delta k_i \times Q_i + \Delta h_i \times F_i}{C_{pi}}, \quad (4)$$

where $b_i$ is the performance feed-forward weighting coefficient of the frame $S_i$.

and $$b_i = a_i \times \frac{C_{pi}}{Q_i}, \quad (5)$$

where $a_i$ is the influence coefficient of the deformation resistance of the frame $S_i$ on the thickness feed-forward parameter compensation, which is an empirical coefficient and obtained through experiments.

Selecting the frame $S_1$ and $S_4$ as the virtual indirect measuring instruments of strip performance, and providing a load cell respectively on the frame $S_1$ and $S_4$, and a thickness gauge respectively at the entries of the frame $S_1$, $S_4$ and $S_5$; calculating the deformation resistance fluctuation of supplied material of the frame $S_1$ according to the formula 1:

$$\Delta k_1 = \frac{\Delta P_1}{Q_1}, \Delta k_4 = \frac{\Delta P_4}{Q_4};$$

finally, calculating the feed-forward adjustment amounts of the frames $S_1$, $S_2$, $S_3$, $S_4$ and $S_5$ respectively, 1) if the frame $S_1$ is selected as a virtual indirect measuring instrument of strip performance, calculating the feed-forward adjustment amount $\Delta y_1$ of the frame $S_1$ according to the formula 2, $$\Delta y_1 = \frac{\Delta h_1 \times F_1}{C_{p1}};$$

2) if the frame $S_2$ is not selected as a virtual indirect measuring instrument of strip performance, that is, $\Delta k_2 = \Delta k_1$, then calculating the feed-forward adjustment amount $\Delta y_2$ of the frame $S_2$ according to the formula 3, $$\Delta y_2 = \frac{\Delta k_2 \times Q_2 + \Delta h_2 \times F_2}{C_{p2}},$$

where $\Delta h_2$ is the thickness deviation of the strip at the entry of the frame $S_2$ measured by the thickness gauge;

3) if the frame $S_3$ is not selected as a virtual indirect measuring instrument of strip performance, that is, $\Delta k_3 = \Delta k_2$, then calculating the feed-forward adjustment amount $\Delta y_3$ of the frame $S_3$ according to the formula 3, $$\Delta y_3 = \frac{\Delta k_3 \times Q_3 + \Delta h_3 \times F_3}{C_{p3}},$$

where because the frame $S_3$ is not provided with a thickness gauge at the entry thereof, $\Delta h_3 = 0$, thus $$\Delta y_3 = \frac{\Delta k_3 \times Q_3}{C_{p3}}.$$

4) if the frame $S_4$ is selected as a virtual indirect measuring instrument of strip performance, because the frame $S_4$ is not provided with a thickness gauge at the entry thereof, the feed-forward adjustment amount for the frame $S_4$ will not be calculated;

5) if the frame $S_5$ is not selected as a virtual indirect measuring instrument of strip performance, that is, $\Delta k_5 = \Delta k_4$, then calculating the feed-forward adjustment amount $\Delta y_5$ of the frame according to the formula 3, $$\Delta y_3 = \frac{\Delta k_3 \times Q_3 + \Delta h_3 \times F_3}{C_{p3}},$$

where $\Delta h_5$ is the thickness deviation of the strip at the entry of the frame $S_5$ measured by the thickness gauge.

In the present invention, the performance feed-forward thickness control method in a tandem cold mill performs the feed-forward thickness control through the deformation resistance force of the supplied materials measured indirectly, makes measurement on the deformation resistance force of each section of the supplied strips through the selected frames, and when the strip is being rolled in the downstream frames, controls the thickness of the strips by comprehensively considering the thickness and the deformation resistance of the supplied materials. The method prevents the effects of the performance fluctuation of the supplied hot rolled products on the thickness precision during the cold rolling and improves the thickness control precision, which is of positive significance to ensure the precision of the thickness of finished products of the strip in the length direction of the entire steel coil, reducing the fluctuation of the thickness of the finished products of the strip and ensuring stable rolling.

BRIEF DESCRIPTION OF THE DRAWINGS

In the drawings, reference numeral 1 indicates a thickness gauge, and reference numeral 2 indicates a pressure measuring instrument.

DETAILED DESCRIPTION OF THE INVENTION

The present invention will be further described in conjunction with the detailed embodiments below. It should be understood that these embodiments are only used for illustrating the present invention but not for limiting the scope thereof. Furthermore, it should be understood that upon reviewing the description of the present invention, those skilled in the art can make any variation or modification to the present invention and these equivalents fall equally into the scope defined by the appended claims of the application.

Embodiment 1

A performance feed-forward thickness control method in a tandem cold mill comprises the following steps:

step 1, selecting one or more frames as virtual indirect measuring instrument(s) of strip performance, in which the frame $S_1$ must be a virtual indirect measuring instrument of strip performance, and a thickness gauge 1 is provided at the entry of the frame $S_1$;

step 2, calculating the value of the deformation resistance fluctuation of supplied materials: providing a load cell 2 on the frames selected as the indirect measuring instruments for the strip performance, measuring the rolling force deviation $\Delta P_i$ caused by the deformation resistance fluctuation of the frame $S_i$ via the load cell 2, then calculating the value of deformation resistance fluctuation $\Delta k_i$ of supplied material of the frame $S_i$ according to the formula 1:

$$\Delta k_i = \frac{\Delta P_i}{Q_i}, \quad (1)$$

where $Q_i$ is the influence coefficient of the deformation resistance on the rolling force of the frame $S_i$, which is an empirical coefficient and obtained through experiments;

step 3, calculating the feed-forward adjustment amount for each frame: calculating the feed-forward adjustment amount $\Delta y_i$ for each frame $S_i$ according to the selection as follows.

1) if the frame $S_i$ is selected as the virtual indirect measuring instrument of strip performance, that is, the frame $S_i$ is provided with a load cell 2, calculating the feed-forward adjustment amount $\Delta y_i$ for the frame $S_i$ according to the formula 2:

$$\Delta y_i = \frac{\Delta h_i \times F_i}{C_{pi}}, \quad (2)$$

where $\Delta h_i$ is the thickness deviation of the strip at the entry of the frame $S_i$ measured by the thickness gauge 1. If there is no thickness gauge 1 provided at the entry of the frame $S_i$, the feed-forward adjustment amount $\Delta y_i$ for the frame $S_i$ will not be calculated;

$C_{pi}$ is the longitudinal rigidity of the frame $S_i$;

$F_i$ is the influence coefficient of the thickness of the strip at the entry of the frame $S_i$ on the rolling force of the frame $S_i$, which is an empirical coefficient and obtained through experiments;

2) if the frame $S_i$ is not selected as the virtual indirect measuring instrument of strip performance, that is, the frame $S_i$ is not provided with a load cell 2, the value of deformation resistance fluctuation of this frame is that of the previous nearest frame, that is, $\Delta k_i = \Delta k_{i-1}$, then calculating the feed-forward adjustment amount $\Delta y_i$ for the frame $S_i$ according to the formula 3:

$$\Delta y_i = \frac{\Delta k_i \times Q_i + \Delta h_i \times F_i}{C_{pi}}, \quad (3)$$

where $\Delta h_i$ is the thickness deviation of the strip at the entry of the frame $S_i$ measured by the thickness gauge 1. If there is no thickness gauge 1 provided at the entry of the frame $S_i$, then $\Delta h_i = 0$;

$C_{pi}$ is the longitudinal rigidity of the frame $S_i$;

$F_i$ is the influence coefficient of the thickness of the strip at the entry of the frame $S_i$ on the rolling force of the frame $S_i$ which is an empirical coefficient and obtained through experiments.

In the feed-forward thickness control method for the performance of a tandem cold mill in the present invention, to further improve the accuracy of thickness control of strips, in the substep 2) of step 3, if the frame $S_i$ is not selected as the virtual indirect measuring instrument of strip performance, that is, the frame $S_i$ is not provided with a load cell 2 but is provided with a thickness gauge 1 at the entry thereof, an influence coefficient $a_i$ of the deformation resistance on the thickness feed-forward parameter compensation may be added when calculating the feed-forward adjustment amount of the frames, then calculating the feed-forward adjustment amount $\Delta y_i$ for each frame $S_i$ according to the formulas 4:

$$\Delta y_i = \frac{b_i \times \Delta k_i \times Q_i + \Delta h_i \times F_i}{C_{pi}}, \quad (4)$$

where $b_i$ is the feed-forward weighting coefficient for the performance of the frame $S_i$;

and $$b_i = a_i \times \frac{C_{pi}}{Q_i}, \quad (5)$$

where $a_i$ is the influence coefficient of the deformation resistance of the frame $S_i$ on the thickness feed-forward parameter compensation, which is an empirical coefficient and obtained through experiments.

Figure 2:
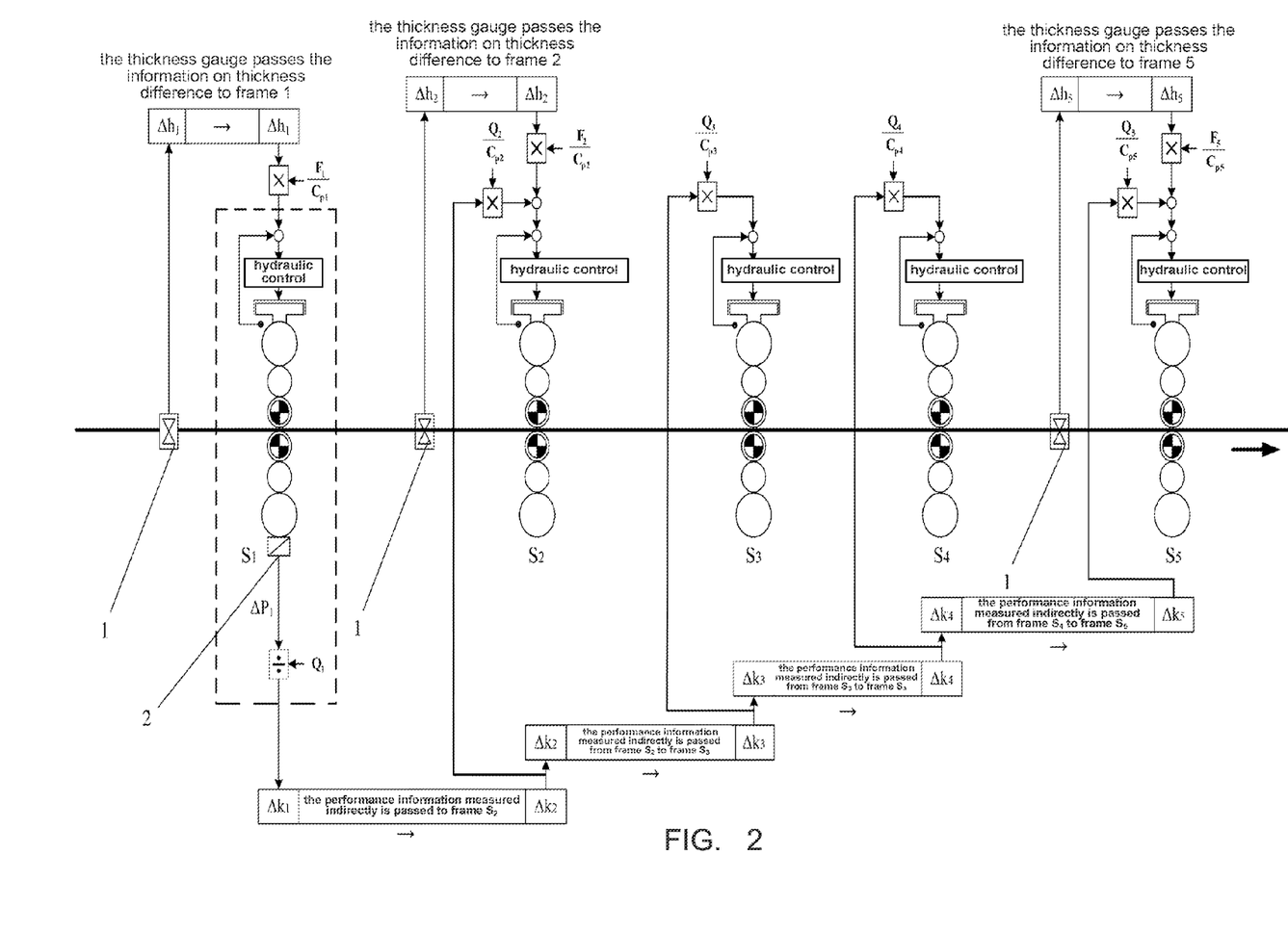
FIG. 2 is the block flow chart of the embodiment 1 of the thickness feed-forward control method in a tandem cold mill in the present invention.

As shown in FIG. 2, the embodiment describes the performance feed-forward thickness control method through a thickness control system of six-roller rolling mill with five frames. In the industrial application, the system is divided into a program running area and a data storage area when the PLC controller is operating. The parameters related to the thickness control algorithm and the strip information table is stored in the data storage area. For the output of the feed-forward control of the frames $S_1$~$S_5$, selecting the frame $S_1$ as the virtual indirect measuring instruments of strip performance, and providing a load cell 2 on the frame $S_1$ and a thickness gauge 1 respectively at the entries of the frames $S_1$, $S_4$ and $S_5$;

Calculating the deformation resistance fluctuation of supplied material of the frame $S_1$ according to the formula 1:

$$\Delta k_1 = \frac{\Delta P_1}{Q_1};$$

and calculating the feed-forward adjustment amount of the frames $S_1$~$S_5$ as follows:

1) if the frame $S_1$ is selected as a virtual indirect measuring instrument of strip performance, calculating the feed-forward adjustment amount $\Delta y_1$ of the frame $S_1$ according to the formula 2, $$\Delta y_1 = \frac{\Delta h_1 \times F_1}{C_{p1}};$$

2) if the frame $S_2$ is not selected as a virtual indirect measuring instrument of strip performance, that is, $\Delta k_2 = k_1$, then calculating the feed-forward adjustment amount $\Delta y_2$ of the frame $S_2$ according to the formula 3, $$\Delta y_2 = \frac{\Delta k_2 \times Q_2 + \Delta h_2 \times F_2}{C_{p2}};$$

3) if the frame $S_3$ is not selected as a virtual indirect measuring instrument of strip performance, that is, $\Delta k_3 = \Delta k_2$, then calculating the feed-forward adjustment amount $\Delta y_3$ of the frame $S_3$ according to the formula 3, $$\Delta y_3 = \frac{\Delta k_3 \times Q_3 + \Delta h_3 \times F_3}{C_{p3}},$$

where because the frame $S_3$ is not provided with a thickness gauge at the entry thereof, $\Delta h_3 = 0$, thus $$\Delta y_3 = \frac{\Delta k_3 \times Q_3}{C_{p3}};$$

4) if the frame $S_4$ is not selected as a virtual indirect measuring instrument of strip performance, that is, $\Delta k_4 = \Delta k_3$, then calculating the feed-forward adjustment amount $\Delta y_4$ of the frame $S_4$ according to the formula 3, $$\Delta y_4 = \frac{\Delta k_4 \times Q_4 + \Delta h_4 \times F_4}{C_{p4}},$$

where because the frame $S_3$ is not provided with a thickness gauge at the entry thereof, $\Delta h_4 = 0$, thus $$\Delta y_4 = \frac{\Delta k_4 \times Q_4}{C_{p4}};$$

5) if the frame $S_5$ is not selected as a virtual indirect measuring instrument of strip performance, that is, $\Delta k_5 = k_4$, then calculating the feed-forward adjustment amount $\Delta y_5$ of the frame $S_5$ according to the formula 3.

$$\Delta y_5 = \frac{\Delta k_5 \times Q_5 + \Delta h_5 \times F_5}{C_{p5}}.$$

Embodiment 2

Figure 3:
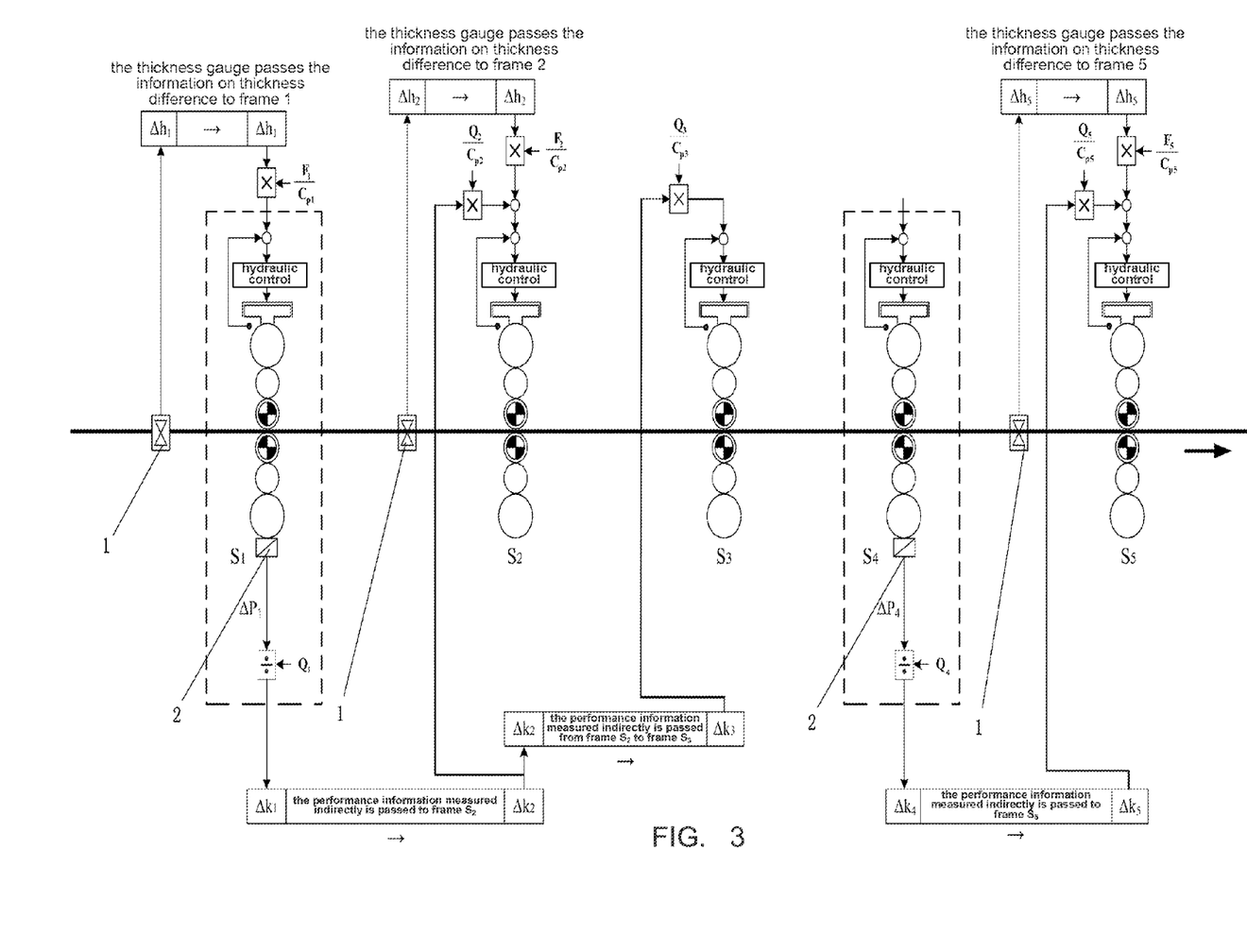
FIG. 3 is the block flow chart of the embodiment 2 of the thickness feed-forward control method in a tandem cold mill in the present invention.

A performance feed-forward thickness control method in tandem cold mill is shown in FIG. 3, the difference between the embodiment 2 and 1 lies in that in the embodiment 2, selecting the frame $S_1$ and $S_4$ as the virtual indirect measuring instruments of strip performance, and providing a load cell 2 respectively on the frame $S_1$ and $S_4$, and a thickness gauge 1 respectively at the entries of the frame $S_1$, $S_4$ (按图, 应为 $S_2$) and $S_5$; calculating the deformation resistance fluctuation of supplied material of the frame $S_1$ according to the formula 1:

$$\Delta k_1 = \frac{\Delta P_1}{Q_1}, \Delta k_4 = \frac{\Delta P_4}{Q_4};$$

finally, calculating the feed-forward adjustment amount of the frames $S_1$, $S_2$, $S_3$, $S_4$ and $S_5$ respectively.

1) if the frame $S_1$ is selected as a virtual indirect measuring instrument of strip performance, calculating the feed-forward adjustment amount $\Delta y_1$ of the frame $S_1$ according to the formula 2.

$$\Delta y_1 = \frac{\Delta h_1 \times F_1}{C_{p1}};$$

2) if the frame $S_2$ is not selected as a virtual indirect measuring instrument of strip performance, that is, $\Delta k_2 = \Delta k_1$, then calculating the feed-forward adjustment amount $\Delta y_2$ of the frame $S_2$ according to the formula 3, $$\Delta y_2 = \frac{\Delta k_2 \times Q_2 + \Delta h_2 \times F_2}{C_{p2}},$$

where $\Delta h_2$ is the thickness deviation of the strip at the entry of the frame $S_2$ measured by the thickness gauge 1;

3) if the frame $S_3$ is not selected as a virtual indirect measuring instrument of strip performance, that is, $\Delta k_3 = k_2$, then calculating the feed-forward adjustment amount $\Delta y_3$ of the frame $S_3$ according to the formula 3

$$\Delta y_3 = \frac{\Delta k_3 \times Q_3 + \Delta h_3 \times F_3}{C_{p3}},$$

where because the frame $S_3$ is not provided with a thickness gauge at the entry thereof, $\Delta h_3 = 0$, thus $$\Delta y_3 = \frac{\Delta k_3 \times Q_3}{C_{p3}}.$$

4) if the frame $S_4$ is selected as a virtual indirect measuring instrument of strip performance, because the frame $S_4$ is not provided with a thickness gauge at the entry thereof, the feed-forward adjustment amount of the frame $S_4$ will not be calculated;

5) if the frame $S_5$ is not selected as a virtual indirect measuring instrument of strip performance, that is, $\Delta k_5 = \Delta k_4$, then calculating the feed-forward adjustment amount $\Delta y_5$ of the frame $S_5$ according to the formula 3, $$\Delta y_5 = \frac{\Delta k_5 \times Q_5 + \Delta h_5 \times F_5}{C_{p5}},$$

where $\Delta h_5$ is the thickness deviation of the strip at the entry of the frame $S_5$ measured by the thickness gauge 1.

Embodiment 3

Figure 4:
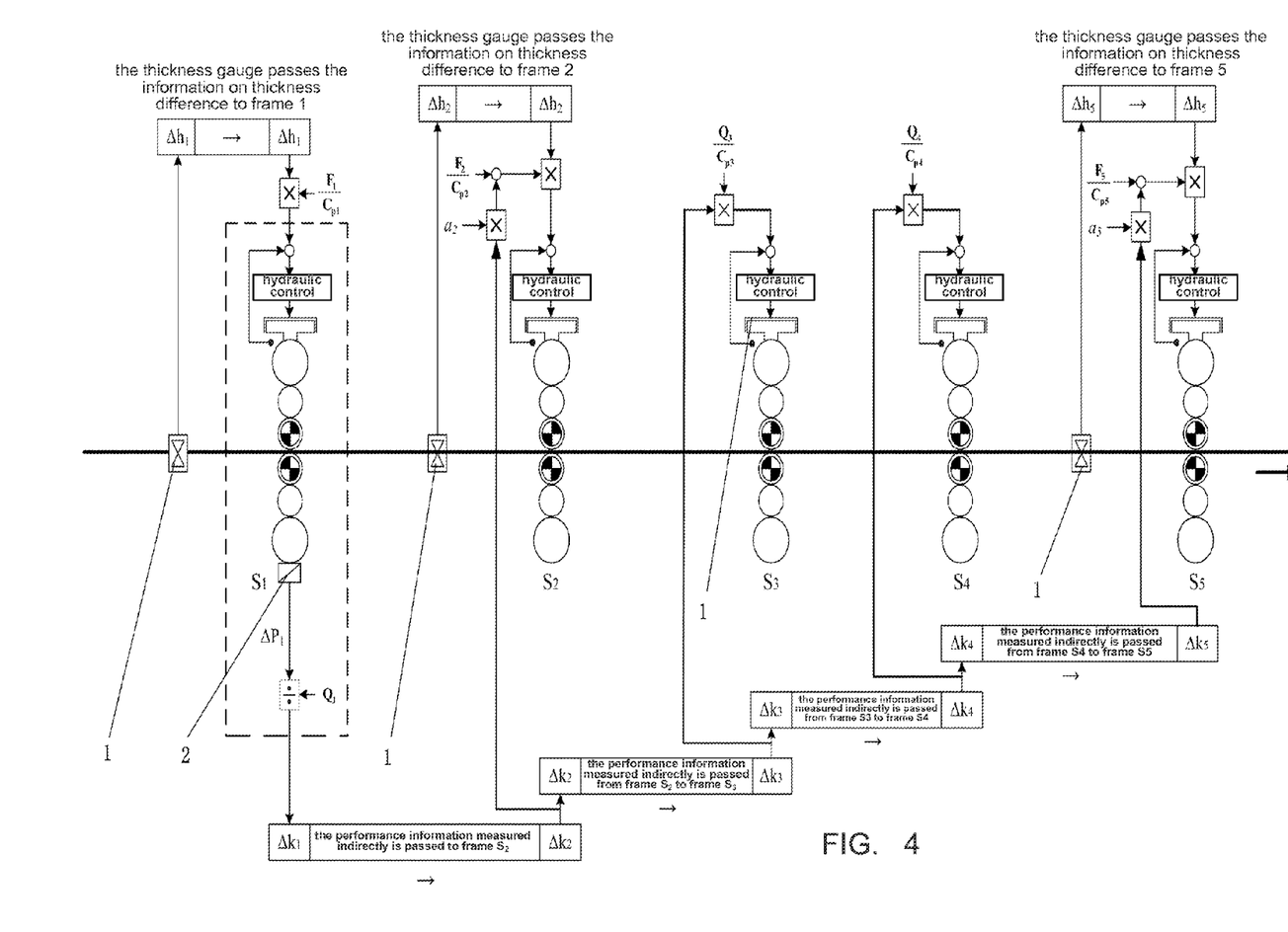
FIG. 4 is the block flow chart of the embodiment 3 of the thickness feed-forward control method in a tandem cold mill in the present invention.

A performance feed-forward thickness control method in a tandem cold mill is shown in FIG. 4, the difference between the embodiment 3 and 1 lies in that in the embodiment 3, an influence coefficient of the deformation resistance on the thickness feed-forward parameter compensation is added when calculating the feed-forward adjustment amount of the frames:

1) if the frame $S_2$ is not selected as a virtual indirect measuring instrument of strip performance, and a thickness gauge 1 is arranged at the entry of the frame $S_2$, that is, $\Delta k_2 = \Delta k_1$, calculating the feed-forward adjustment amount $\Delta y_2$ of the frame $S_2$ according to the formula 4 and 5, $$\Delta y_2 = \frac{b_2 \times \Delta k_2 \times Q_2 + \Delta h_2 \times F_2}{C_{p2}},$$

where $b_2$ is the performance feed-forward weighting coefficient of the frame $S_2$.

and $$b_2 = a_2 \times \frac{C_{p2}}{Q_2},$$

where $a_2$ is the influence coefficient of the deformation resistance of the frame $S_2$ on the thickness feed-forward parameter compensation, which is an empirical coefficient and obtained through experiments.

2) if the frame $S_5$ is not selected as a virtual indirect measuring instrument of strip performance, and a thickness gauge 1 is arranged at the entry of the frame $S_5$ that is, $\Delta k_5 = \Delta k_4$, calculating the feed-forward adjustment amount $\Delta y_5$ of the frame $S_5$ according to the formula 4, $$\Delta y_5 = \frac{b_5 \times \Delta k_5 \times Q_5 + \Delta h_5 \times F_5}{C_{p5}},$$

where $b_5$ is the performance feed-forward weighting coefficient of the frame $S_5$.

and $$b_5 = a_5 \times \frac{C_{p5}}{Q_5},$$

where $a_5$ is the influence coefficient of the deformation resistance of the frame $S_5$ on the thickness feed-forward parameter compensation, which is an empirical coefficient and obtained through experiments.

Embodiment 4

Figure 5:
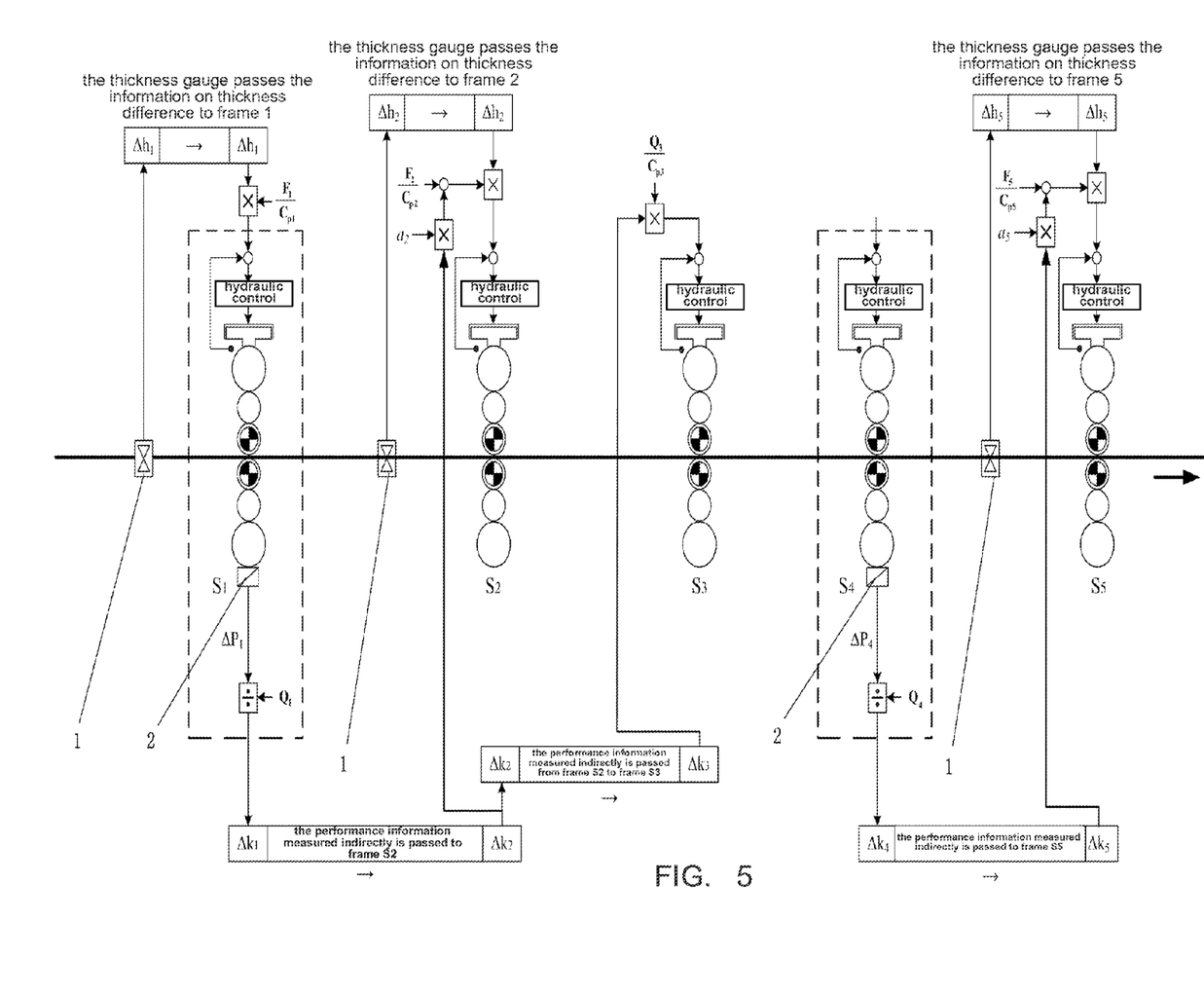
FIG. 5 is the block flow chart of the embodiment 4 of the thickness feed-forward control method in a tandem cold mill in the present invention.

A performance feed-forward thickness control method in a tandem cold mill is shown in FIG. 5, the difference between the embodiment 4 and 2 lies in that in the embodiment 4, an influence coefficient of the deformation resistance on the thickness feed-forward parameter compensation is added when calculating the feed-forward adjustment amount of the frames:

1) if the frame $S_2$ is not selected as a virtual indirect measuring instrument of strip performance, that is, $\Delta k_2 = \Delta k_1$, and a thickness gauge 1 is arranged at the entry of the frame $S_2$, calculating the feed-forward adjustment amount $\Delta y_2$ of the frame $S_2$ according to the formula 4, $$\Delta y_2 = \frac{b_2 \times \Delta k_2 \times Q_2 + \Delta h_2 \times F_2}{C_{p2}},$$

where $b_2$ is the performance feed-forward weighting coefficient of the frame $S_2$.

and $$b_2 = a_2 \times \frac{C_{p2}}{Q_2},$$

where $a_2$ is the influence coefficient of the deformation resistance of the frame $S_2$ on the thickness feed-forward parameter compensation, which is an empirical coefficient and obtained through experiments.

2) if the frame $S_5$ is not selected as a virtual indirect measuring instrument of strip performance, that is, $\Delta k_5 = k_4$, and a thickness gauge 1 is arranged at the entry of the frame $S_5$, calculating the feed-forward adjustment amount $\Delta y_5$ of the frame $S_5$ according to the formula 4, $$\Delta y_5 = \frac{b_5 \times \Delta k_5 \times Q_5 + \Delta h_5 \times F_5}{C_{p5}},$$

where $b_5$ is the performance feed-forward weighting coefficient of the frame $S_5$.

and $$b_5 = a_5 \times \frac{C_{p5}}{Q_5},$$

where $a_5$ is the influence coefficient of the deformation resistance of the frame $S_5$ on the thickness feed-forward parameter compensation, which is an empirical coefficient and obtained through experiments.

The invention claimed is:

1. A performance feed-forward thickness control method for a control system comprising a plurality of frames $S_i$ in a tandem cold mill, comprises the following steps:

step 1: providing a thickness gauge at the entry of $S_1$ and selecting $S_1$ as a virtual indirect measuring instrument for strip performance;

step 2: providing a load cell on the frames that are selected as the indirect measuring instruments for the strip performance, measuring the rolling force deviation $\Delta P_i$ caused by the deformation resistance fluctuation of the frame $S_i$ via the load cell, then calculating the value of deformation resistance fluctuation $\Delta k_i$ of supplied material of the frame $S_i$ according to the formula 1:

$$\Delta k_i = \frac{\Delta P_i}{Q_i}, \quad (1)$$

where $Q_i$ is the influence coefficient of the deformation resistance on the rolling force of the frame $S_i$, which is an empirical coefficient and obtained through experiments;

step 3: calculating the feed-forward adjustment amount $\Delta y_i$ for each frame $S_i$ according to the selection as follows:

substep 1: if the frame $S_i$ is selected as the virtual indirect measuring instrument of strip performance, that is, the frame $S_i$ is provided with a load cell, calculating the feed-forward adjustment amount $\Delta y_i$ for the frame $S_i$ according to the formula 2:

$$\Delta y_i = \frac{\Delta h_i \times F_i}{C_{pi}}, \quad (2)$$

where $\Delta h_i$ is the thickness deviation of the strip at the entry of the frame $S_i$ measured by a thickness gauge, if there is no thickness gauge provided at the entry of the frame $S_i$, the feed-forward adjustment amount $\Delta y_i$ for the frame $S_i$ will not be calculated; $C_{pi}$ is the longitudinal rigidity of the frame $S_i$; $F_i$ is the influence coefficient of the thickness of the strip at the entry of the frame $S_i$ on the rolling force of the frame $S_i$ which is an empirical coefficient and obtained through experiments; and substep 2: if the frame $S_i$ is not selected as the virtual indirect measuring instrument of strip performance, that is, the frame $S_i$ is not provided with a load cell, the value of deformation resistance fluctuation of this frame is that of the previous nearest frame, that is, $\Delta k_i = \Delta k_{i-1}$, then calculating the feed-forward adjustment amount $\Delta y_i$ for the frame $S_i$ according to the formula 3:

$$\Delta y_i = \frac{\Delta k_i \times Q_i + \Delta h_i \times F_i}{C_{pi}}, \quad (3)$$

where $\Delta h_i$ is the thickness deviation of the strip at the entry of the frame $S_i$ measured by a thickness gauge, if there is no thickness gauge provided at the entry of the frame $S_i$, then $\Delta h_i = 0$; $C_{pi}$ is the longitudinal rigidity of the frame $S_i$; $F_i$ is the influence coefficient of the thickness of the strip at the entry of the frame $S_i$ on the rolling force of the frame $S_i$, which is an empirical coefficient and obtained through experiments, and wherein the control system uses the calculated feed-forward adjustment to control the thickness of the thickness of cold rolled strips.

2. The performance feed-forward thickness control method in a tandem cold mill according to claim 1, characterized in that in the substep 2) of step 3, if the frame $S_i$ is not selected as the virtual indirect measuring instrument of strip performance, that is, the frame $S_i$ is not provided with a load cell but is provided with a thickness gauge at the entry thereof, an influence coefficient $\alpha_i$ of the deformation resistance on the thickness feed-forward parameter compensation is added when calculating the feed-forward adjustment amount of the frame, then calculating the feed-forward adjustment amount $\Delta y_i$ for the frame $S_i$ according to the formulas 4 and 5:

$$\Delta y_i = \frac{b_i \times \Delta k_i \times Q_i + \Delta h_i \times F_i}{C_{pi}}, \quad (4)$$

where $b_i$ is the performance feed-forward weighting coefficient of the frame $S_i$, and $$b_i = a_i \times \frac{C_{pi}}{Q_i}, \quad (5)$$

where $\alpha_i$ is the influence coefficient of the deformation resistance of the frame $S_i$ on the thickness feed-forward parameter compensation, which is an empirical coefficient and obtained through experiments.

3. The performance feed-forward thickness control method in a tandem cold mill according to claim 1, characterized in that the frames $S_1$ and $S_4$ are selected as the virtual indirect measuring instruments of strip performance, and providing a load cell respectively on the frame $S_1$ and $S_4$, and a thickness gauge respectively at the entries of the frame $S_1$, $S_4$ and $S_5$; calculating the deformation resistance fluctuation of supplied material of the frame $S_1$ according to the formula 1:

$$\Delta k_1 = \frac{\Delta P_1}{Q_1}, \Delta k_4 = \frac{\Delta P_4}{Q_4};$$

finally, calculating the feed-forward adjustment amounts of the frames $S_1$, $S_2$, $S_3$, $S_4$ and $S_5$ respectively, 1) if the frame $S_1$ is selected as a virtual indirect measuring instrument of strip performance, calculating the feed-forward adjustment amount $\Delta y_1$ of the frame $S_1$ according to the formula 2, $$\Delta y_1 = \frac{\Delta h_1 \times F_1}{C_{p1}};$$

2) if the frame $S_2$ is not selected as a virtual indirect measuring instrument of strip performance, that is, $\Delta k_2 = \Delta k_1$, then calculating the feed-forward adjustment amount $\Delta y_2$ of the frame $S_2$ according to the formula 3, $$\Delta y_2 = \frac{\Delta k_2 \times Q_2 + \Delta h_2 \times F_2}{C_{p2}},$$

where $\Delta h_2$ is the thickness deviation of the strip at the entry of the frame $S_2$ measured by the thickness gauge;

3) if the frame $S_3$ is not selected as a virtual indirect measuring instrument of strip performance, that is, $\Delta k_3 = \Delta k_2$, then calculating the feed-forward adjustment amount $\Delta y_3$ of the frame $S_3$ according to the formula 3, $$\Delta y_3 = \frac{\Delta k_3 \times Q_3 + \Delta h_3 \times F_3}{C_{p3}},$$

where because the frame $S_3$ is not provided with a thickness gauge at the entry thereof, $\Delta h_3 = 0$, thus $$\Delta y_3 = \frac{\Delta k_3 \times Q_3}{C_{p3}};$$

4) if the frame $S_4$ is selected as a virtual indirect measuring instrument of strip performance, because the frame $S_4$ is not provided with a thickness gauge at the entry thereof, the feed-forward adjustment amount of the frame $S_4$ will not be calculated;

5) if the frame $S_5$ is not selected as a virtual indirect measuring instrument of strip performance, that is, $\Delta k_5 = \Delta k_4$, then calculating the feed-forward adjustment amount $\Delta y_5$ of the frame $S_5$ according to the formula 3, $$\Delta y_5 = \frac{\Delta k_5 \times Q_5 + \Delta h_5 \times F_5}{C_{p5}},$$

where $\Delta h_5$ is the thickness deviation of the strip at the entry of the frame $S_5$ measured by the thickness gauge.

4. The performance feed-forward thickness control method of claim 1, wherein step 1 further comprises selecting one or more additional frames as virtual indirect measuring instrument(s) for strip performance.

\* \* \* \* \*

UNITED STATES PATENT AND TRADEMARK OFFICE
CERTIFICATE OF CORRECTION

PATENT NO. : 9,623,459 B2
APPLICATION NO. : 14/366034
DATED : April 18, 2017
INVENTOR(S) : Jianghua Xu et al.

Page 1 of 1

It is certified that error appears in the above-identified patent and that said Letters Patent is hereby corrected as shown below:

In the Specification

Column 4, Line 52, " $\Delta y_3 = \dfrac{\Delta k_3 x Q_3 + \Delta h_3 x F_3}{C_{p3}}$ " should be -- $\Delta y_5 = \dfrac{\Delta k_5 x Q_5 + \Delta h_5 x F_5}{C_{p5}}$ --.

Column 8, Line 42, "$S_4$" should be --$S_2$--.

Column 8, Lines 42-43, " " should be deleted.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*